(12) United States Patent
Shustorovich et al.

(10) Patent No.: US 8,890,873 B2
(45) Date of Patent: Nov. 18, 2014

(54) INTERACTIVE ELECTRONIC BOOK

(75) Inventors: Alexander Shustorovich, New York, NY (US); Olga Zakharova, Moscow (RU); Natalia Churakova, Moscow (RU)

(73) Assignee: Pleiades Publishing Limited, New York, NY (US)

( * ) Notice: Subject to any disclaimer, the term of this patent is extended or adjusted under 35 U.S.C. 154(b) by 264 days.

(21) Appl. No.: 13/347,231

(22) Filed: Jan. 10, 2012

(65) Prior Publication Data

US 2013/0083033 A1    Apr. 4, 2013

Related U.S. Application Data

(60) Provisional application No. 61/540,822, filed on Sep. 29, 2011.

(51) Int. Cl.
*G06T 11/00* (2006.01)
*G06F 15/02* (2006.01)

(52) U.S. Cl.
CPC ............ *G06T 11/00* (2013.01); *G06F 15/0291* (2013.01)
USPC ........................................................ 345/467

(58) Field of Classification Search
None
See application file for complete search history.

(56) References Cited

U.S. PATENT DOCUMENTS

| 7,401,286 B1 | 7/2008 | Hendricks et al. |
| 2009/0241054 A1 | 9/2009 | Hendricks |
| 2010/0315359 A1 | 12/2010 | Seong |

OTHER PUBLICATIONS

International Search Report for PCT Patent Application No. US2012/024565 dated May 21, 2012, 12 pages.

*Primary Examiner* — Phi Hoang
*Assistant Examiner* — Mohammad H Akhavannik
(74) *Attorney, Agent, or Firm* — Amin, Turocy & Watson, LLP

(57) ABSTRACT

The interactive electronic book can be displayed on a dual-screen electronic device, with a first screen that displays the text of the book, and a second screen that displays the contextual references. Links to the contextual references can be displayed on the first screen alongside the text or embedded in the text. The contextual references can be historical descriptions, pictures, videos, contemporaneous writings and so on that help to put the text of the book in context. The contextual references can relate to the portion of the text that is displayed on the first screen. Different modes allow for the displayed text to be shown in marked mode, or unmarked mode. The interactive electronic book can also include testing software which tests the reader on their understanding of the text. The interactive electronic book can also be updated with new texts and contextual references.

20 Claims, 10 Drawing Sheets

INTERACTIVE ELECTRONIC BOOK

RELATED APPLICATION

This application claims priority to U.S. Provisional Patent Appln. No. 61/540,822, filed Sep. 29, 2011, and entitled "INTERACTIVE ELECTRONIC BOOK (A WORK OF FICTION IN THE HISTORICAL-CULTURAL CONTEXT) AS A VEHICLE OF SELF-EDUCATION," the entirety of which provisional application is incorporated herein by reference.

TECHNICAL FIELD

This disclosure relates generally to an interactive electronic book in an educational environment.

BACKGROUND

When reading a book, fiction or non-fiction, readers can often lack the proper context in which to fully grasp the nuances of the text. This is especially true when the book was written long ago, or was written for an audience with different social and cultural experiences. Writers will often unconsciously assume that audiences are familiar with the same experiences and knowledge as themselves. Even though the text itself may not explicitly reference customs, mores, or events, they are often implicitly referred.

Contemporaneous writings and descriptive non-fiction such as historical and cultural commentaries can fill in the gaps of knowledge, but require the reader to spend time researching and discovering what content is relevant. If the reader has limited knowledge or experience with the social and cultural background, the reader may not even know what subjects are relevant to understanding the text, limiting the usefulness of the research.

Doing external research while reading through a text can inhibit a seamless reading experience as the reader switches between different books and resources. Searching for relevant information can also take a long time, possibly inducing the reader to cease researching, which in turn decreases the understanding the reader has of the text.

The above-described deficiencies of contextualizing written texts are merely intended to provide an overview of some problems of current technology, and are not intended to be exhaustive. Other problems with the state of the art, and corresponding benefits of some of the various non-limiting embodiments described herein, may become further apparent upon review of the following detailed description.

SUMMARY

In various non-limiting embodiments, systems and methods are provided to use an interactive electronic book in an education environment. In an example embodiment, a method comprises displaying text on a first graphical display of an electronic device and selecting a reference linked to the text. The method can also include displaying the reference according to a positional relationship with respect to the text, wherein the reference provides context about the text.

In another example embodiment, a system comprises a datastore configured to store text and a set of contextual references that correspond to the text. The system can also include a linking component configured to select a contextual reference from the set of contextual references that corresponds to a portion of the text. The system can also include a display component configured to display the portion of the text and the contextual reference on a graphical display.

In another example embodiment, a computer readable storage medium comprising computer executable instructions that, in response to execution, cause a computing system to perform operations, comprising displaying text on a first graphical display of an electronic device and selecting references linked to the text displayed on the electronic device. The instructions can also cause the computing system to perform operations including displaying the references alongside the text, wherein the references provide context about the text.

These and other embodiments are described in more detail below.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
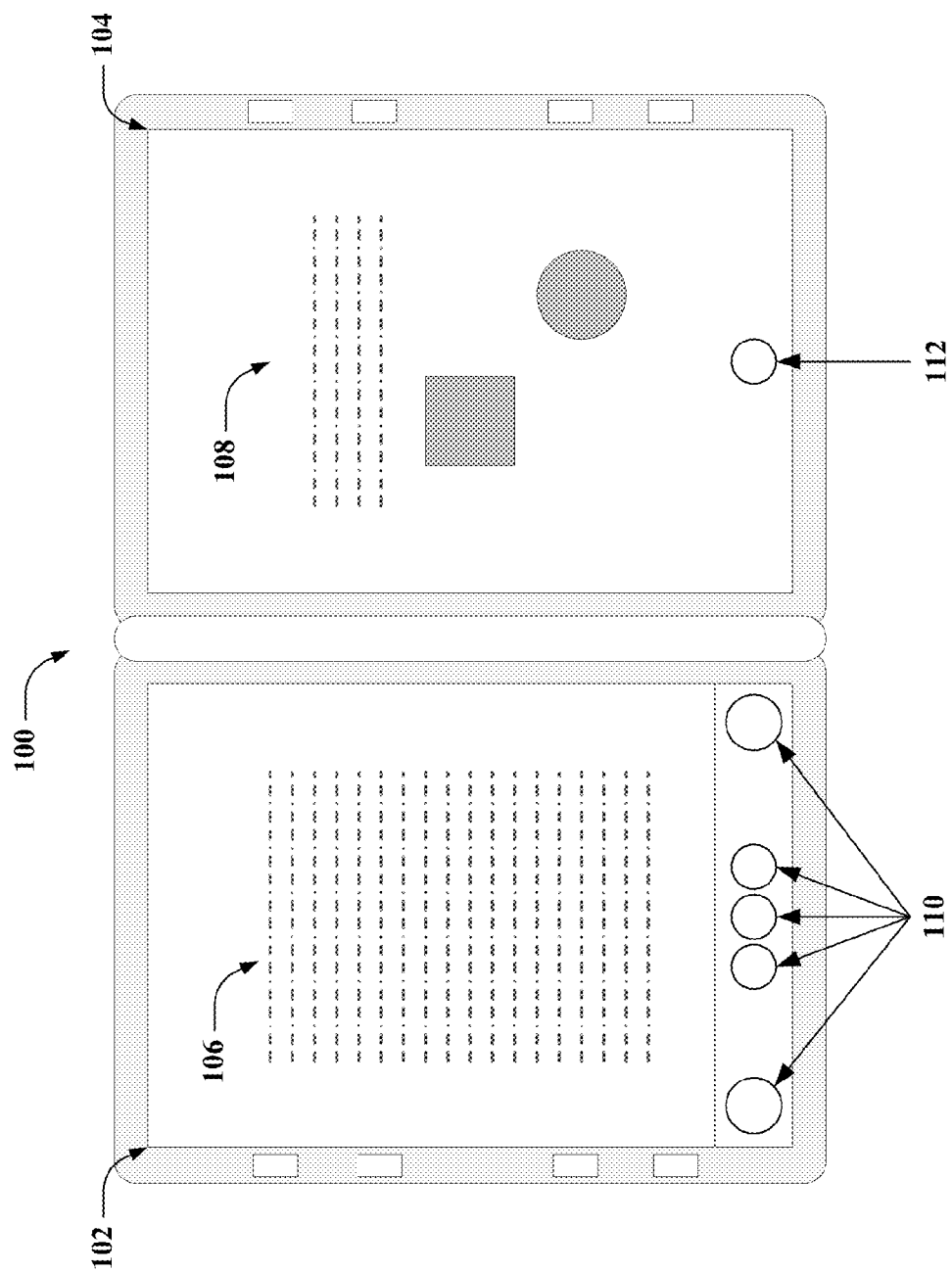
FIG. 1 is a diagram illustrating an example, non-limiting embodiment of an interactive electronic book.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above identified deficiencies of reading books that are written with different social and cultural contexts than the readers are familiar with, various systems and methods of using an interactive electronic book are described herein to help provide proper contextualization. The interactive electronic book can be displayed on a dual-screen electronic device, with a first screen that displays the text of the book, and a second screen that displays the contextual references. Links to the contextual references can be displayed on the first screen alongside the text or embedded in the text. The contextual references can be historical descriptions, pictures, videos, contemporaneous writings and so on that help to put the text of the book in context. The contextual references can relate to the portion of the text that is displayed on the first screen. Different modes can display the text in marked mode, or unmarked mode. The interactive electronic book can also include testing software that tests the reader on their understanding of the text. The interactive electronic book can also be updated with new texts and contextual references.

Turning now to FIG. 1, a diagram illustrating an example, non-limiting embodiment of an interactive electronic book is shown. Interactive electronic book 100 can include a first graphical display 102 and a second graphical display 104. The first graphical display 102 can display the text 106, and navigation and menu buttons 110. The second graphical display 104 can display the contextual reference 108 as well as navigation button(s) 112.

Interactive electronic book 100 can be a handheld electronic device. The electronic device can include memory that can store the books and contextual references. The memory can be in the form of a hard drive, FLASH memory, or any other memory storage suitable for storing electronic books and interactive resources. The electronic device can also include a processor and graphics processor to display the text and contextual references on the screens of the device.

It is to be appreciated that while FIG. 1 shows that interactive electronic book 100 has two displays, 102 and 104, other configurations are possible. For example, interactive electronic book 100 can also have one graphical display that is split into two windows. Interactive electronic book 100 can also be installed and implemented on existing desktop and laptop computers. Interactive electronic book 100 can also be incorporated on electronic book readers.

In some embodiments, interactive electronic book 100 can be folded along an axis between graphical displays 102 and 104. In other embodiments, the physical configuration of interactive electronic book 100 can remain static. Graphical displays 102 and 104 can be LCD screens or can utilize electronic ink. In some embodiments, one screen can be an LCD, and the other display can use electronic ink.

Graphical display 102 can show text 106. Text 106 can be a portion of an electronic book. The amount of text 106 shown on graphical display 102 can vary as different font sizes can be selected. Graphical display 104 can display contextual references 108. Contextual references 108 can correspond to the portion of the text 106 currently being displayed. As text 106 changes, contextual references 108 can be updated to maintain correspondence.

Navigation and menu buttons 110 and 112 can be used to navigate through the text and contextual references and provide extra functionality. In some embodiments, graphical displays 102 and 104 can be touchscreen monitors, and the buttons 110 and 112 can be selected by touching the screens. In other embodiments, buttons 110 and 112 can be selected using a cursor controlled by physical navigation keys or a mouse communicatively coupled to the interactive electronic book 100. In an alternative embodiment, buttons 110 and 112 can be physical buttons integral to the interactive electronic book 100. In this embodiment the buttons can have dedicated functionality or can be soft-keys, with programmable functions.

Figure 2:
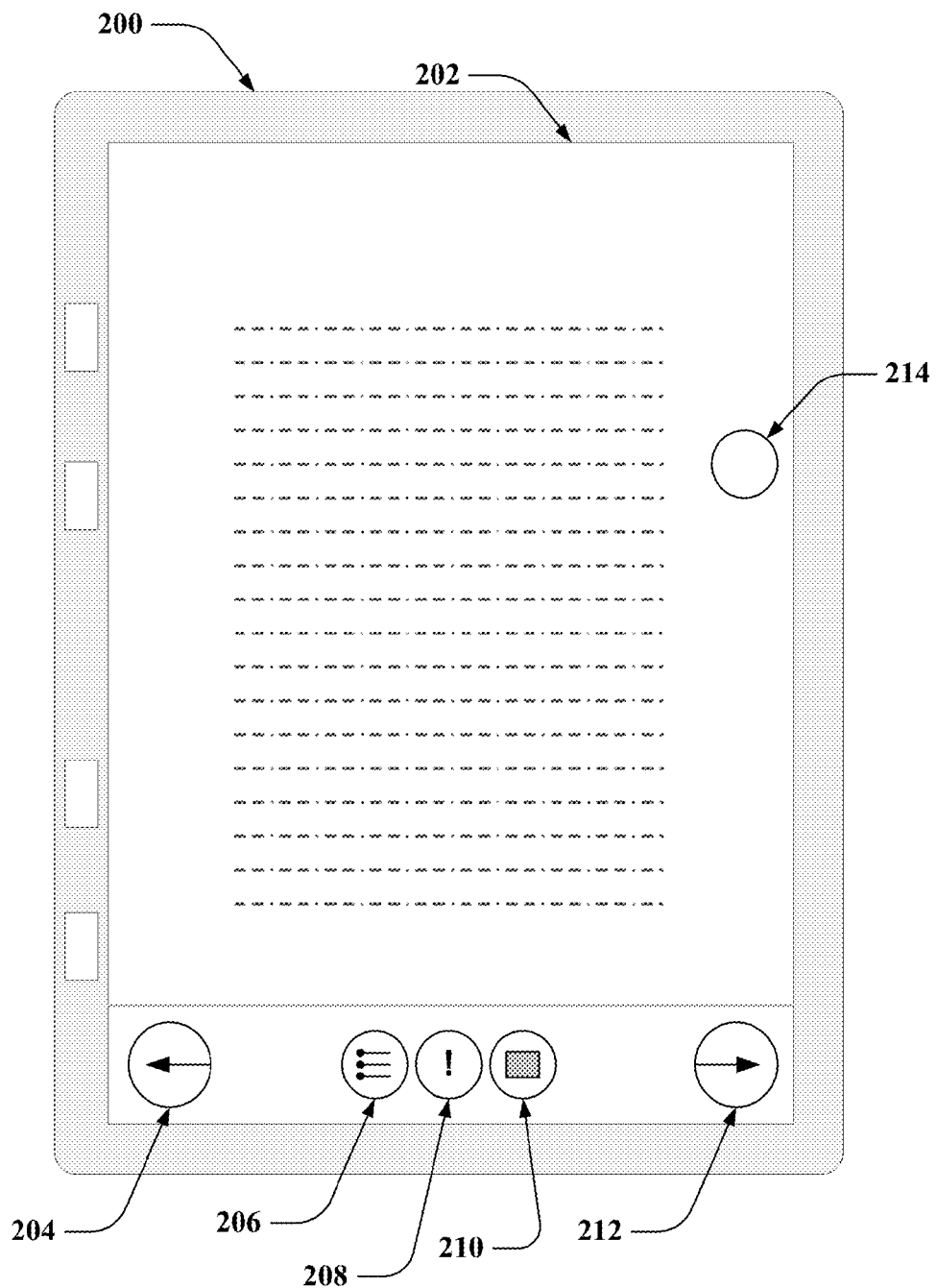
FIG. 2 is a diagram illustrating an example, non-limiting embodiment of a screen of an interactive electronic book.

Turning now to FIG. 2, a diagram illustrating an example, non-limiting embodiment of a screen of an interactive electronic book is shown. Interactive electronic book 200 can have a graphical display 202 that is configured to display a portion of text from an electronic book. Graphical display 202 can also include buttons 204, 206, 208, 210, and 212 for various menus, functions, and navigation. Contextual reference link 214 can also be provided to link to relevant references that correspond to the portion of text displayed by the graphical display 202.

Forward and reverse buttons, 212 and 204 respectively, can be provided to navigate through the text displayed on graphical display 202. Selecting one of buttons 204 or 212 can change the page of text, or can scroll through the text in the desired direction.

Table of contents button 206 can link to the table of contents for the electronic book. The table of contents can provide a list of chapters of the electronic book, as well as list the resources used as contextual references. The resources can be listed as they appear in the text, or can be listed by subject matter content, or can be grouped into text resources, audio resources, video resources, or picture resources. The table of contents can also list testing resources for the interactive electronic book.

Button 208 can be provided to link to the text located in the electronic library. Button 210 can be provided to toggle between a marked and an unmarked mode (described in more detail in FIG. 3).

Contextual reference link 214 can link to one of the text, audio, video or picture references that are relevant to the text being displayed on graphical display 202. Contextual reference link 214 can be located in a vertical column next to the displayed text, and can be located at a level that corresponds to the portion of text. It is to be appreciated that while FIG. 2 shows one contextual reference link 214, more than one link can be placed in the column. For instance, if text displayed on graphical display 202 has four portions of text that have explanatory contextual references, then four links to the contextual references can appear in the vertical column next to the text.

Figure 3:
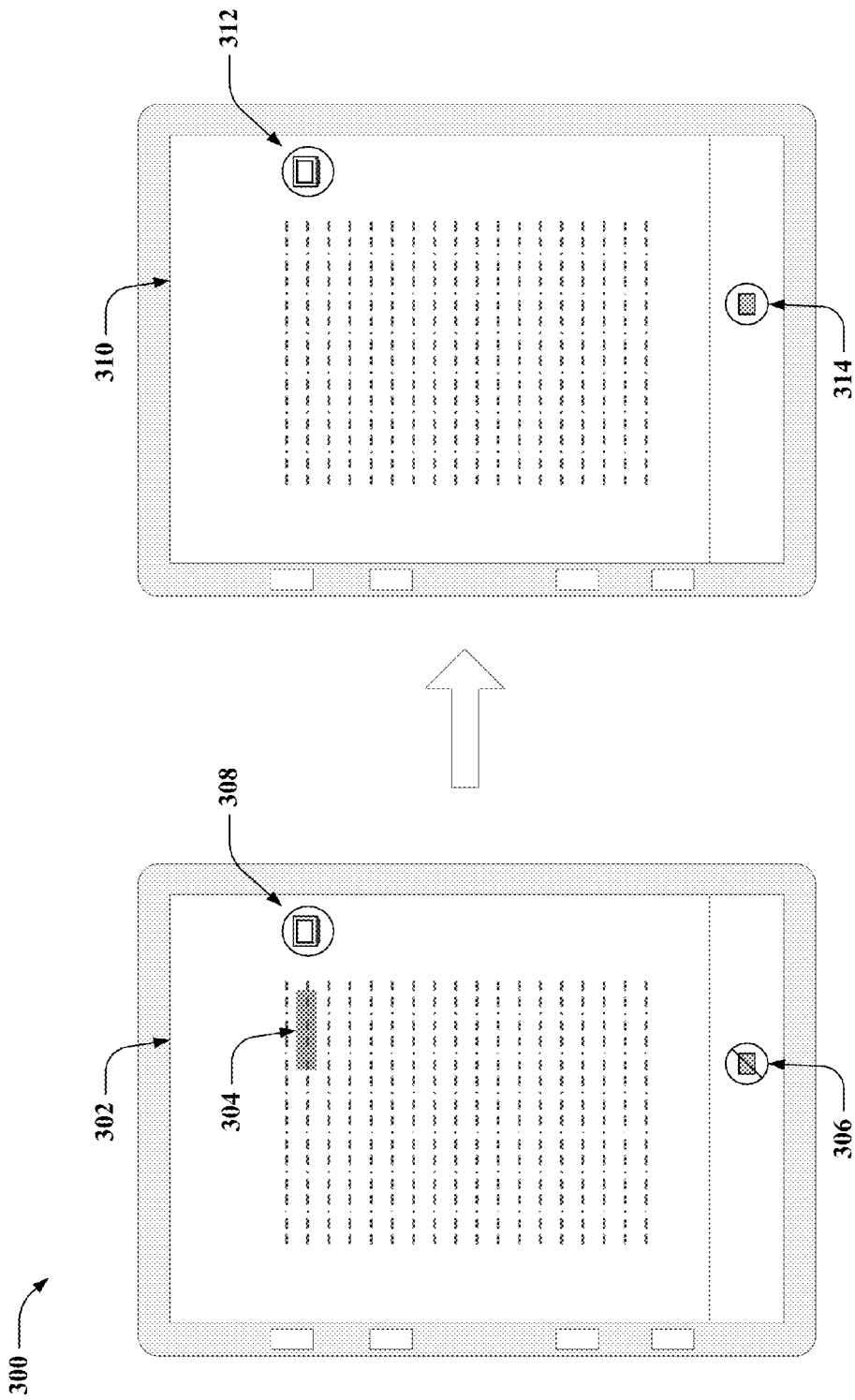
FIG. 3 is a diagram illustrating an example, non-limiting embodiment of an interactive electronic book in marked mode and unmarked mode.

Turning now to FIG. 3, a diagram illustrating an example, non-limiting embodiment of an interactive electronic book in marked mode and unmarked mode is shown. Diagram 300 shows graphical display 302 with text highlighted in marked mode, and graphical display 310 shows the text in unmarked mode.

In marked mode, the portion of text that corresponds to a contextual reference 304 can be marked to make it easier to see what part of the text the contextual references helps to explain. The text can be highlighted, the color, size or style of the font can be changed, or the text can be underlined to distinguish the text in marked mode. To mark the text, any change to the text that makes it distinguishable from the surrounding unmarked test can be done.

The link to the contextual reference 308 can be provided next to the marked text 304. The link 308 can identify what type of contextual reference is being linked to. Different icons can be used to identify video resources, audio resources, textual resources, and picture resources.

Toggle 306 can be provided to switch between marked and unmarked mode. In unmarked mode, the toggle 314 can be displayed differently to distinguish between the different modes. For example, in FIG. 3, toggle 306 in marked mode, is displayed with a line through the toggle button to indicate that selecting that button will switch to unmarked mode. In unmarked mode, toggle 314 can be displayed without a line through it to indicate that selecting that mode will switch to marked mode.

In unmarked mode, graphical display 310 can continue to display a link to contextual reference 312 even when the text is unmarked. The link 312 can remain in the same location as link 308, opposite the portion of text to which the contextual reference refers. While FIG. 3 shows one contextual reference link besides the text, any number of contextual reference links is possible. For instance, if the text displayed on graphical display 302 or 310 has five portions of text with corresponding contextual references, five links to contextual references can be displayed in the vertical column besides the text, at heights corresponding to the location of the portion of text relative to the rest of the text.

Figure 4:
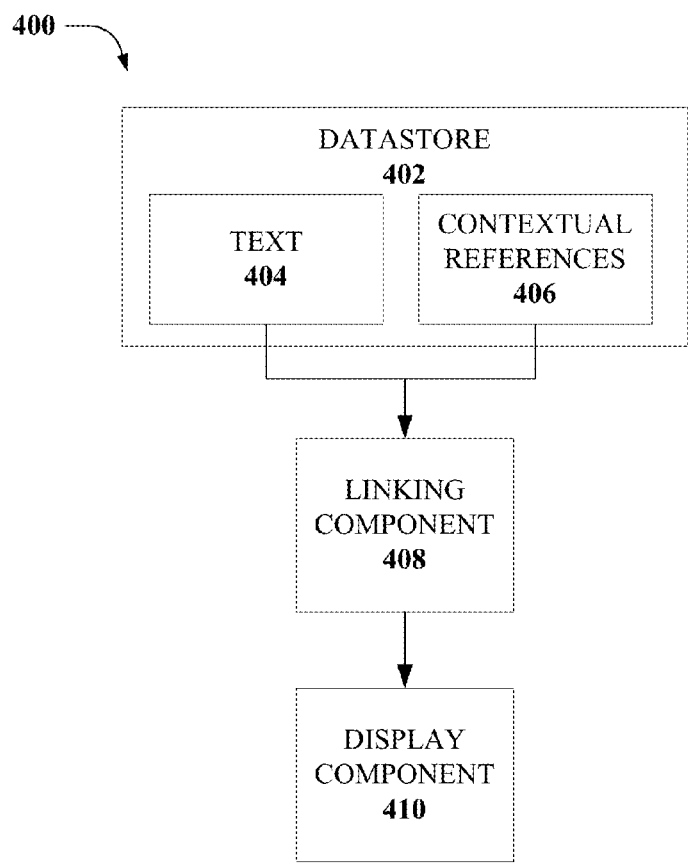
FIG. 4 is a block diagram illustrating an example, non-limiting embodiment of a system for displaying text and contextual references on the screens of an interactive electronic book.

Turning now to FIG. 4, a block diagram illustrating an example, non-limiting embodiment of a system 400 for displaying text and contextual references on the screens of an interactive electronic book is shown. System 400 can include a datastore 402 that is configured to store text 404 and contextual references 406. A linking component 408 can be provided to select a contextual reference that corresponds to a portion of text, and a display component 410 can be provided to display the portion of text and the contextual reference on a graphical display.

The datastore 402 can be in the form of a hard drive, FLASH memory, or any other memory storage suitable for storing electronic books and interactive resources. In some embodiments, datastore 402 can be on the electronic device, and in other embodiments, datastore 402 can be remotely located. When datastore 402 is remote, it can be stored in the cloud, and accessed via the internet. Data services on the electronic device such as WIFI, 4G, 3G, or other communication protocols can be used to access the remote datastore 402.

Text 404, stored on datastore 402, can be a portion of, or an entire electronic book. Text 404 can also store multiple electronic books at once. The electronic books can be downloaded or installed by a user, or can alternatively come with the interactive electronic book when it is purchased and thus be preinstalled. Contextual references 406 can be a library of resources that are related to text 404. The resources can include video, audio, textual, or pictorial resources that can explain, and contextualize the text.

As an example, if a fiction book set in the past in a foreign country is stored in text 404, contextual references 406 can provide more information about that time period and country. For instance, the references can include such information as documentary videos, pictures of towns, historical writings, and social and cultural commentary that provide information about the time period and location. Such information can provide a better understanding of the text 404, helping the reader to visualize the setting and grasp the nuances in the text more clearly.

Linking component 408 can be configured to select a contextual reference from the set of contextual references that corresponds to a portion of the text. The library of resources can be somewhat relevant to the entire text of the electronic book, but specific items from the library of resources might hold special relevance for certain portions of the text. For instance, if a particular location or event is mentioned in the text of the fiction book, items from the library of resources that pertain to the location or event are particularly relevant to that portion of text. The same item may also be relevant to other portions of text, and similarly, the portion of text can be linked to many different items from the resource library.

In some embodiments, the linking component can be configured to select relevant contextual references based on associations made manually. In this embodiment, when the text of the electronic book and the library of resources are downloaded or installed, the contextual references and the portion of the text the references correspond to, can have been pre-associated. In other embodiments, the linking component 408 can generate associations between the text and the resources automatically. Linking component 408 can automatically generate the associations based on context, relevance, past actions, pattern-matching, or other artificial intelligence techniques.

In an embodiment, the linking component 408 can select multiple contextual references that are relevant to portions of the text. A user can select which contextual reference they want displayed. A user can also set up a filter for certain types of contextual references. For instance, in response to receiving an indication that video or audio resources are preferred, the linking component 408 can select audio and video contextual references that correspond to the text.

Linking component 408 can also update the selected contextual references in response to the portion of text being updated. As the reader reads through the text 404, the portion of text being displayed by the display component 410 changes. Linking component 408 can search the set of contextual references 406 to select particular references that correspond to the portion of text being displayed on the screen, and continuously update the references as the text changes.

Display component 410 can be configured to display the portion of the text and the contextual reference on a graphical display. Display component 410 can display both the text and the contextual references on the same display, or can display the text and contextual references on separate screens. Display component 410 can also be configured to display a link to the contextual reference that corresponds to the portion of text directly next to the portion of text. When that link is selected, the display component can then display the contextual reference on the other display.

Figure 5:
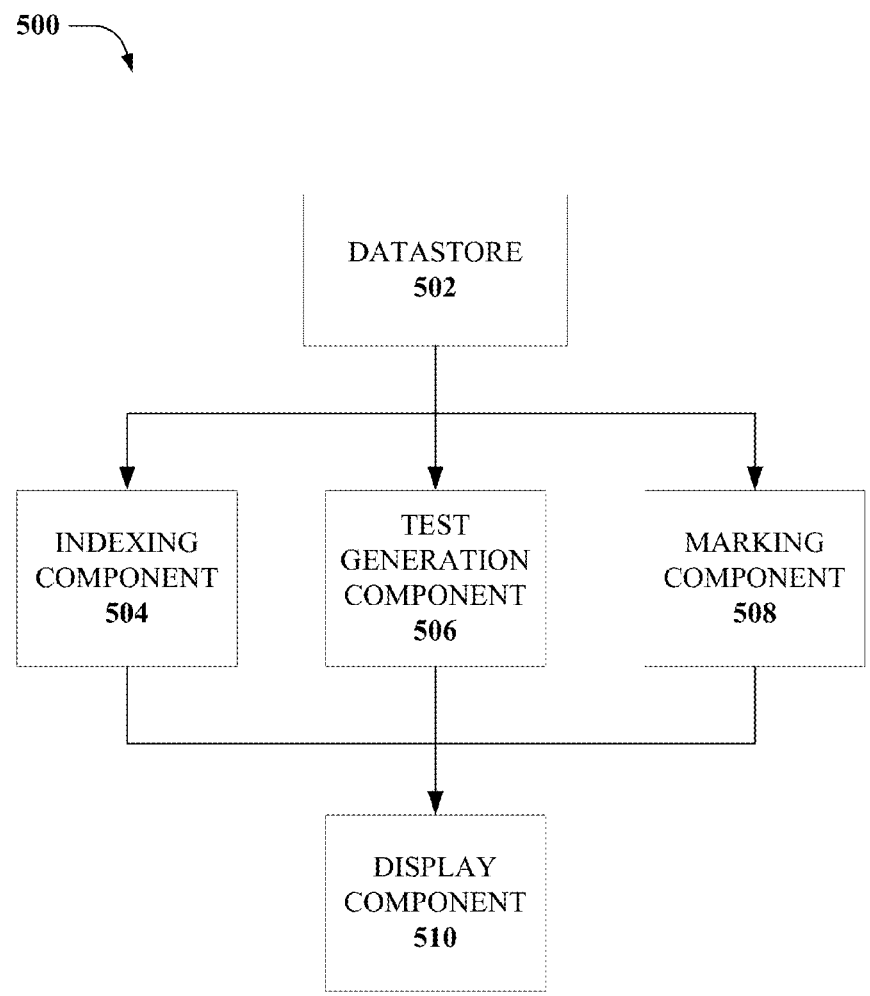
FIG. 5 is a block diagram illustrating an example, non-limiting embodiment of a system that provides tools for an interactive electronic book.

Turning now to FIG. 5, a block diagram illustrating an example, non-limiting embodiment of a system 500 that provides various tools for an interactive electronic book. System 500 can include a datastore 502 that stores text and contextual references that are displayed on the interactive electronic book. System 500 can also include indexing component 504, test generation component 506, and marking component 508, each of which can perform various functions related to the interactive electronic book. Display component 510 can be configured to display the results of the functions on the screens of the interactive electronic book.

Indexing component 504 can be configured to generate a table of contents of the text and contextual references. The table of contents can provide a list of chapters of the electronic book, as well as list the resources used as contextual references. The resources can be listed as they appear in the text, or can be listed by subject matter content, or can be grouped into text resources, audio resources, video resources, or picture resources. The table of contents can also list testing resources for the interactive electronic book.

In an embodiment, the indexing component 504 can be configured to generate the table of contents by analyzing metadata associated with the text and contextual references. Metadata tags can identify the subject matter of the text and references, and identify position of the text in relationship to the rest of the electronic book. A table of contents can be generated from analyzing the metadata tags.

In another embodiment, the indexing component can also be configured to provide links to the full versions of the contextual references. The references used in the library of resources can just contain small portions of other works, and the indexing component can analyze the references to determine the source of the reference. Once the source of the reference is located, the indexing component can provide a link to the full version of the references, or provide a link to where the full versions can be purchased.

Once the table of contents is generated, display component 510 can shows the table of contents on one of the graphical displays of the interactive electronic book. Links to the table of contents can also be generated and displayed in the interactive electronic book menu and shortcut bar.

Test generation component 506 can be configured to generate quizzes based on the text and contextual references. Tests and quizzes can be used to allow the readers to test themselves on their comprehension of the text. The tests can be based on the text, or can be based on the contextual references, in order to test how well the reader understands the context of the book. The tests can be automatically generated, or the test generation component can receive a list of questions from another source, and select a set of the questions to be used in the test. The display component 510 can display the tests when they are generated, and provide answers in response to the reader taking the test, so that the tests themselves can be used as learning tools.

Marking component 508 can be configured to mark a portion of the text that corresponds to a contextual reference. When the marking mode has been selected, marking component 508 can analyze information associated with the contextual references and the text, to identify the portions of text that corresponds to the contextual reference. Once identified, marking component 508 can indicate that display component 510 should distinguish that portion of text from text around it. The text can be highlighted, the color, size or style of the font can be changed, or the text can be underlined to distinguish the text in marked mode. To mark the text, any modification to the text that distinguishes the text from the surrounding unmarked test is sufficient.

Figure 6:
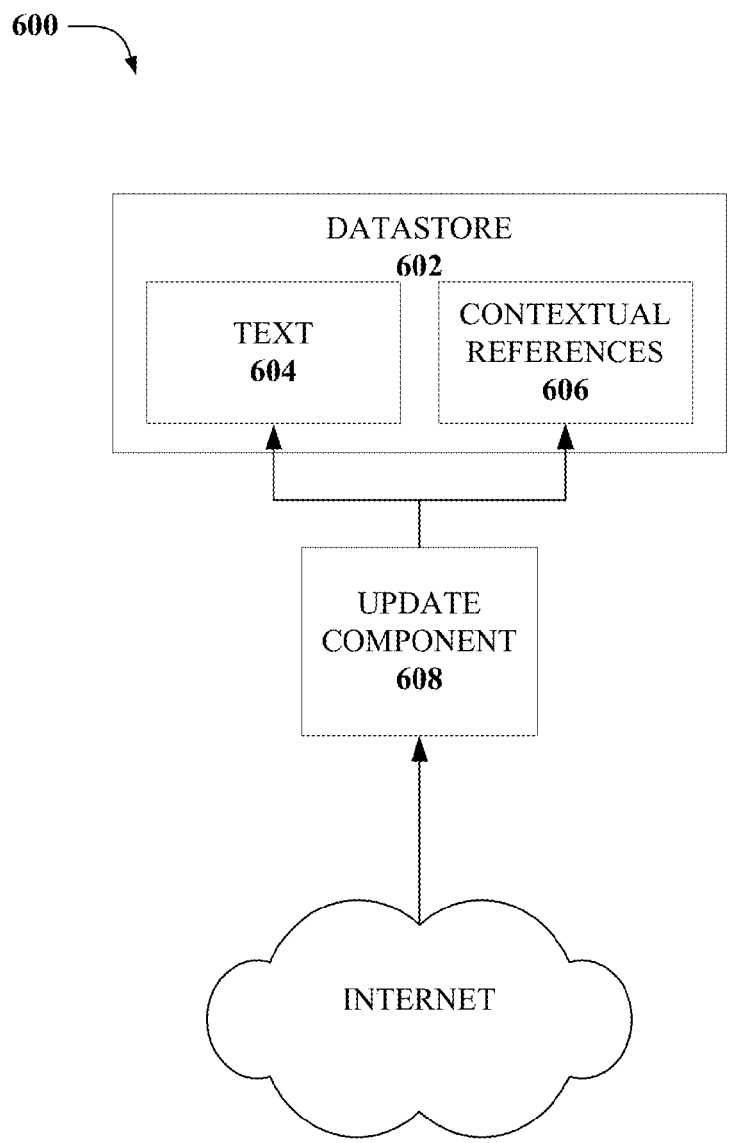
FIG. 6 is a block diagram illustrating an example, non-limiting embodiment of a system for updating text and contextual references on an interactive electronic book.

Turning now to FIG. 6, a block diagram is shown illustrating an example, non-limiting embodiment of a system for updating text and contextual references on an interactive electronic book. System 600 can include a datastore 602 that stores text 604 and contextual references 606. An update component 608 can be provided to update the text 604 and contextual references 606 using information downloaded from the internet.

The update component 608 can periodically monitor the text 604 and contextual references 606 and compare the information to that available online to determine whether or not the text 604 and contextual references 606 are out of date. In some embodiments, update component 608 can determine whether a new version, edition, or translation of a book is available, and prompt the user to ask whether or not the new version should replace the current version. In other embodiments, update component 608 can determine that new contextual references are available that can provide different contextual background of the text, and can download the new contextual references automatically.

In some embodiments, update component 608 can also be configured to modify the metadata associated with the contextual references and the text. In some embodiments, update component 608 can receive instructions to modify the metadata from an electronic book publisher, and update the metadata accordingly.

Figure 7:
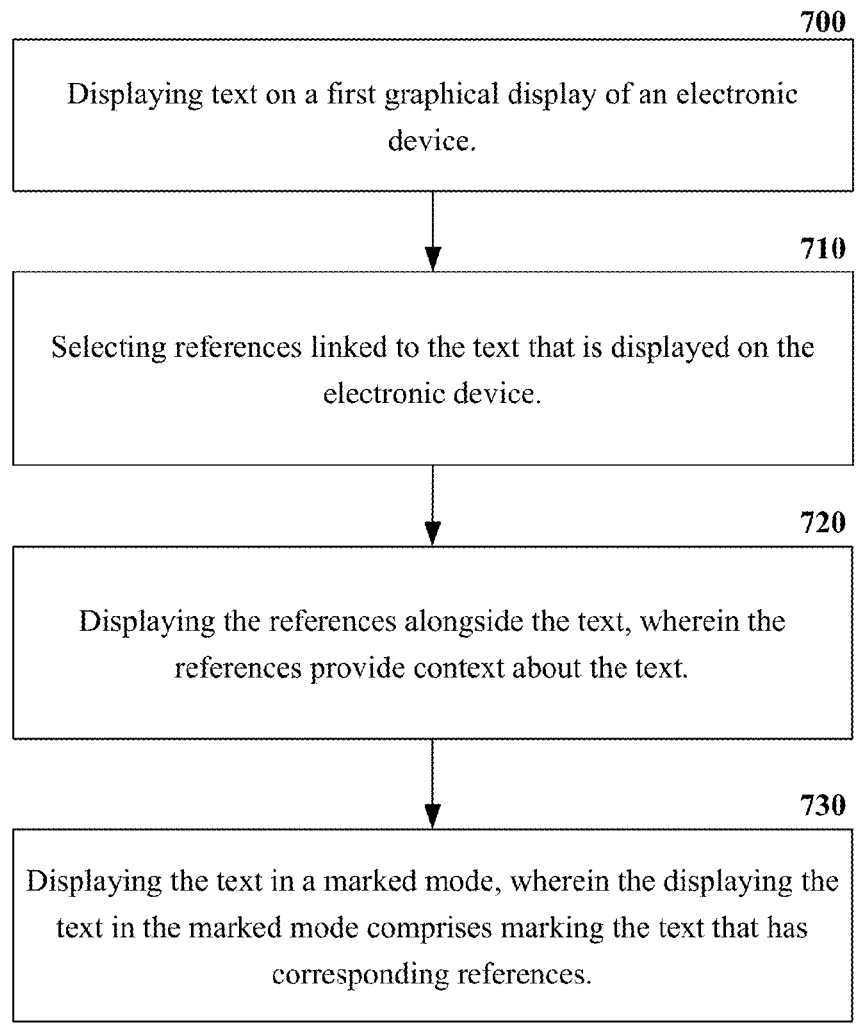
FIG. 7 illustrates a flow diagram of an example, non-limiting embodiment of a method for displaying text and contextual references on an interactive electronic book.

FIG. 7 illustrates a process in connection with systems 100-600 of FIGS. 1-6. The process of FIG. 7 can be implemented for example by systems 100-600. FIG. 7 illustrates a flow diagram of an example, non-limiting embodiment of a method for displaying text and contextual references on an interactive electronic book. At 700, text is displayed on a first graphical display of an electronic device. The text displayed can be a portion of an electronic book or the entire electronic book. The amount of text displayed can vary as font size and type are adjusted.

At 710, references linked to the text displayed on the electronic device are selected. The references can be contextual references that are selected from a library of resources. The library of resources can be somewhat relevant to the entire text of the electronic book, but specific items from the library of resources might hold special relevance for certain portions of the text. For instance, if a particular location or event is mentioned in the text of the fiction book, items from the library of resources that pertain to the location or event are particularly relevant to that portion of text. The same item may also be relevant to other portions of text, and similarly, the portion of text can be linked to many different items from the resource library. The references that are selected are references that are particularly relevant to the text that is currently being displayed on the first graphical display.

The relevant contextual references can be selected based on metadata associated with the text and the references. Matching metadata tags can indicate that the references are particularly relevant. Selecting references can also be made automatically based on context, relevance, past actions, pattern-matching, or other artificial intelligence techniques.

At 720, the references are displayed alongside the text, wherein the references provide context about the text. The text and the references can be displayed on the same screen or on different screens. A link to the reference can be displayed on the same screen as the text, in a vertical column beside the text. Clicking on the link can initiate the displaying of the reference on the other screen.

At 730, the text can be displayed in marked mode, wherein the text that has corresponding references is marked up. In marked mode, the portion of text that corresponds to a reference can be marked to make it easier to see what part of the text the contextual references helps to explain. The text can be highlighted, the color, size or style of the font can be changed, or the text can be underlined to distinguish the text in marked mode. To mark the text, any change to the text that makes it distinguishable from the surrounding unmarked test can be done. The text can also be displayed in unmarked mode, where the link to the reference is still displayed in the vertical column, but the text is unmarked to make it easier to read.

Figure 8:
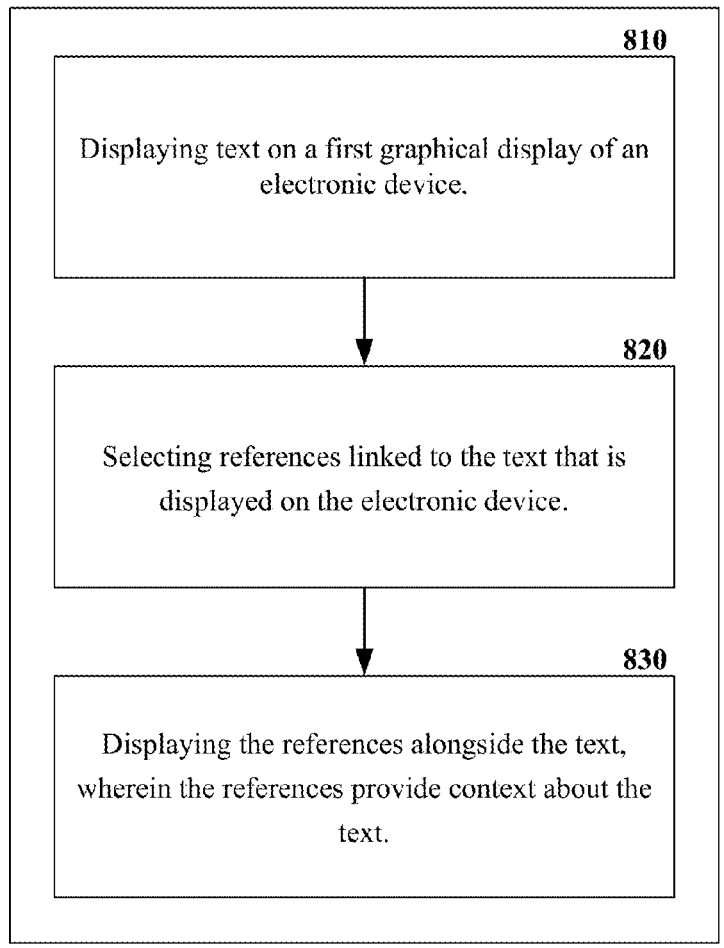
FIG. 8 illustrates a flow diagram of an example, non-limiting embodiment of a set of computer-readable instructions for displaying text and contextual references on an interactive electronic book.

Turning now to FIG. 8, flow diagram of an example, non-limiting embodiment of a set of computer-readable instructions for displaying text and contextual references on an interactive electronic book is shown. Computer readable storage medium 800 can include computer executable instructions. At 810, these instructions can operate to display text on a first graphical display of an electronic device. The text displayed can be a portion of an electronic book or the entire electronic book. The amount of text displayed can vary as font size and type are adjusted.

At 820, the instructions can operate to select references linked to the text that is displayed on the electronic device. The references can be contextual references that are selected from a library of resources. The library of resources can be somewhat relevant to the entire text of the electronic book, but specific items from the library of resources might hold special relevance for certain portions of the text. For instance, if a particular location or event is mentioned in the text of the fiction book, items from the library of resources that pertain to the location or event are particularly relevant to that portion of text. The same item may also be relevant to other portions of text, and similarly, the portion of text can be linked to many different items from the resource library. The references that are selected are references that are particularly relevant to the text that is currently being displayed on the first graphical display.

At 830, the instructions can operate to display the references alongside the text, wherein the references provide context about the text. The text and the references can be displayed on the same screen or on different screens. A link to the reference can be displayed on the same screen as the text, in a vertical column beside the text. Clicking on the link can initiate the displaying of the reference on the other screen.

Figure 9:
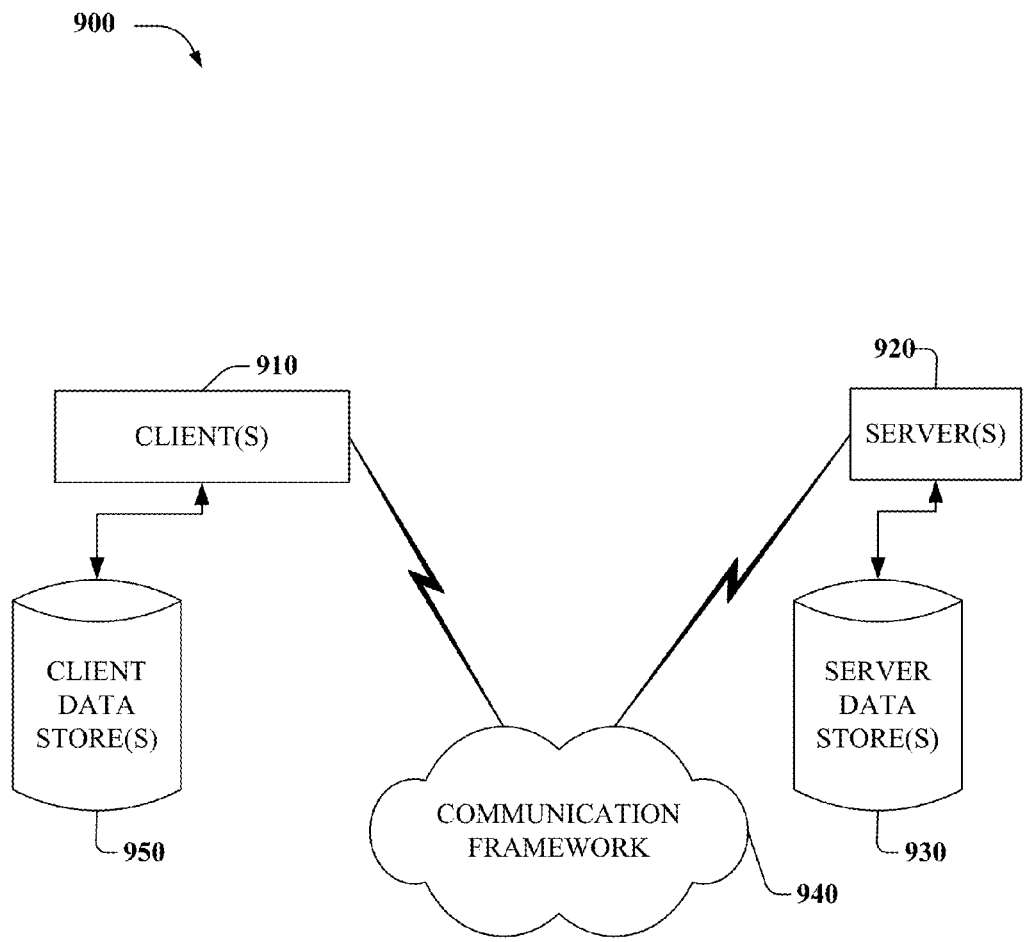
FIG. 9 is a block diagram illustrating an example networking environment that can be employed in accordance with the claimed subject matter.

Turning now to FIG. 9 a block diagram illustrating an example networking environment that can be employed in accordance with the claimed subject matter is shown. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

Figure 10:
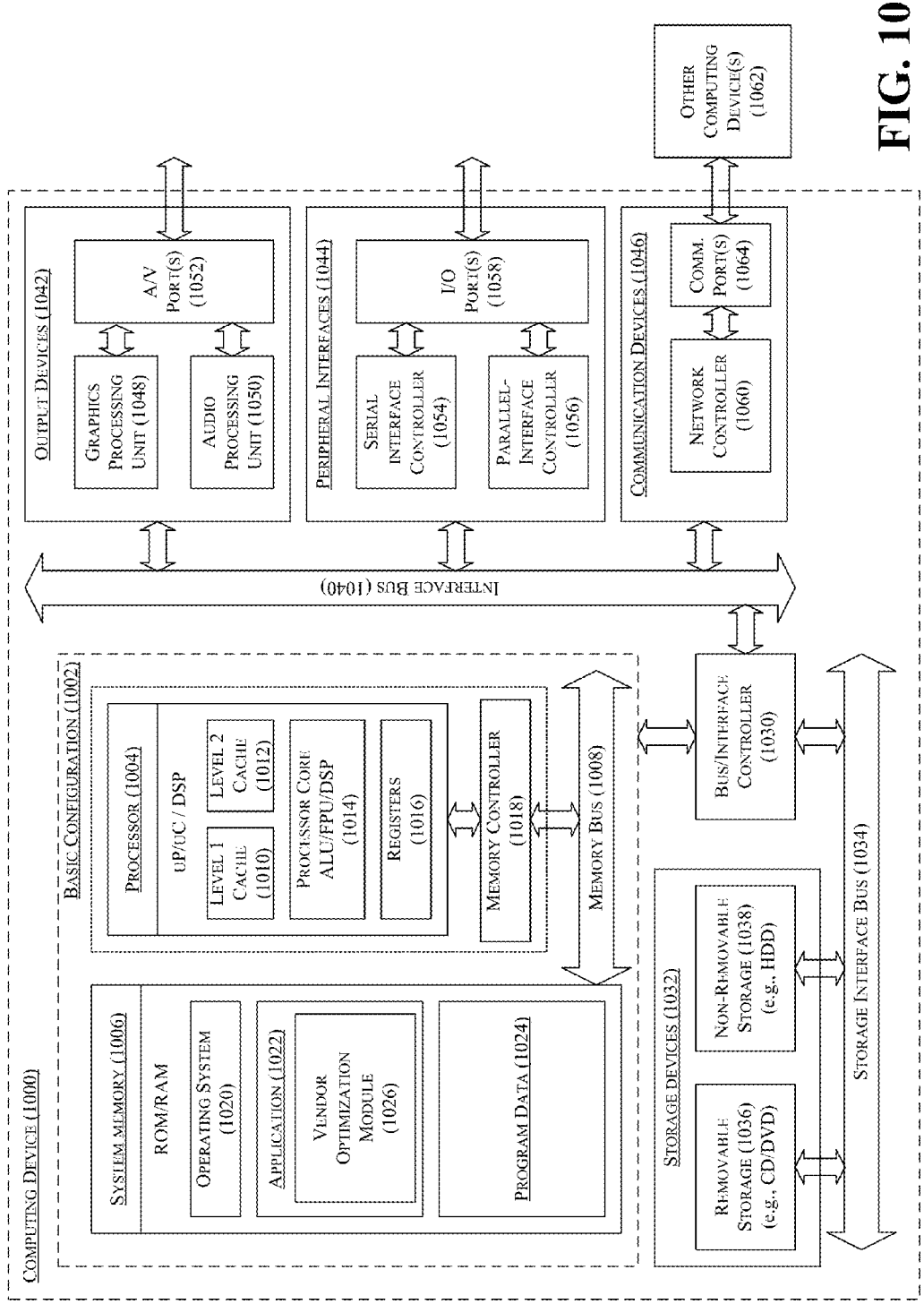
FIG. 10 is a block diagram illustrating an example computing device that is arranged for at least some of the embodiments of the claimed subject matter.

Referring now to FIG. 10, there is illustrated a block diagram of a computer operable to provide networking and communication capabilities between a wired or wireless communication network and a server and/or communication device. In order to provide additional context for various aspects thereof, FIG. 10 and the following discussion are intended to provide a brief, general description of a suitable computing environment 1300 in which the various aspects of the innovation can be implemented. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the exemplary environment 1000 for implementing various aspects includes a computer 1002, the computer 1302 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1011 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 2394 serial port, a game port, a USB port, an IR interface, etc.

A monitor 1044 or other type of display device is also connected to the system bus 1008 through an interface, such as a video adapter 1046. In addition to the monitor 1044, a computer typically includes other peripheral output devices (not shown), such as speakers, printers, etc.

The computer 1002 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least wireless fidelity (WiFi) and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11(a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

displaying, by a system comprising at least one processing device, text on a first graphical display of an electronic device;

selecting, by the system, a reference associated with the text based on a function of context, relevance, and past linked reference selections, wherein the reference is selected from a set of references that conform to a filter setting associated with a type of the reference;

displaying, by the system, the reference on a second graphical display of the electronic device, wherein the first graphical display and the second graphical display are separate screens and wherein the reference provides additional information associated with the text;

selecting, by the system, a second reference in response to new text being displayed on the first graphical display, wherein the second reference is associated with the new text;

generating, by the system, test data representing a test that tests comprehension of the text, wherein the test data comprises question data representing questions based on content associated with the text and the selected reference; and displaying, by the system, answer data representing answers to the questions of the test in response to the test being determined to have been taken.

2. The method of claim 1, further comprising displaying the reference on the first graphical display of the electronic device.

3. The method of claim 2, wherein the displaying the text and the displaying the reference further comprise displaying the text and the reference on disparate electronic devices that are communicatively linked.

4. The method of claim 1, wherein the selecting the reference is in response to receipt of a user input command.

5. The method of claim 1, further comprising displaying, by the system, links to the reference on the first graphical display.

6. The method of claim 5, wherein the displaying links further comprises displaying links in a vertical column next to the text, wherein the links are displayed near the corresponding text.

7. The method of claim 1, further comprising displaying, by the system, the text in a marked mode, wherein the displaying the text in the marked mode comprises marking the text that has a corresponding reference.

8. The method of claim 7, further comprising displaying, by the system, a toggle for selecting between the marked mode and an unmarked mode.

9. The method of claim 1, wherein the generating test data further comprises selecting the questions from a test question database.

10. A system, comprising:
a memory storing executable instructions; and
a processor, communicatively coupled to the memory, which executes, or facilitates execution of, one or more of the executable instructions to at least:
store text and a set of references that correspond to the text;
determine contextual information about the text based on analysis of the text;
select a reference from the set of references that corresponds to a portion of the text and the contextual information associated with the portion of the text based on a function of context, relevance and past linked reference selections, wherein the reference is selected from the set of references that conform to a filter setting associated with a type of the reference; and
display the portion of the text on a first graphical display of an electronic device, and display the reference on a second graphical display of the electronic device, wherein the first graphical display and the second graphical display are separate screens;
select a second reference, a second reference in response to new text being displayed on the first graphical display, wherein the second reference is associated with the new text;
generate test data representing a test that tests comprehension of the text, wherein the test data comprises question data representing questions based on content associated with the text and the selected reference; and
display answer data representing answers to the questions of the test in response to the test being determined to have been taken.

11. The system of claim 10, wherein the reference is displayed on the first graphical display.

12. The system of claim 10, wherein the processor further executes or facilitates the execution of the executable instructions to:
select the reference in response to receipt of a user input command.

13. The system of claim 10, wherein the processor further executes or facilitates the execution of the executable instructions to:
generate a table of contents of text and references.

14. The system of claim 10, wherein the processor further executes or facilitates the execution of the executable instructions to:
display a link to the reference next to the portion of text on the first graphical display.

15. The system of claim 14, wherein the processor further executes or facilitates the execution of the executable instructions to:
mark the portion of text corresponding to the reference.

16. The system of claim 15, wherein the processor further executes or facilitates the execution of the executable instructions to:
unmark the portion of text in response to receipt of a user input command.

17. The system of claim 10, wherein the processor further executes or facilitates the execution of the executable instructions to:
generate test data based on questions selected from a test question database.

18. A non-transitory computer readable storage medium comprising computer executable instructions that, in response to execution, cause a computing system to perform operations, comprising:
displaying text on a first graphical display of an electronic device;
selecting a reference associated with the text based on a function of context, relevance, and past linked reference selections, wherein the reference is selected from a set of references that conform to a filter setting associated with a type the reference;
displaying the reference on a second graphical display of the electronic device, wherein the first graphical display and the second graphical display are separate screens and wherein the reference provides additional information associated with the text;
selecting a second reference in response to new text being displayed on the first graphical display, wherein the second reference is associated with the new text;
generating test data representing a test that tests comprehension of the text, wherein the test data comprises question data representing questions based on content associated with the text and the selected reference; and
displaying answer data representing answers to the questions of the test in response to the test being determined to have been taken.

19. The non-transitory computer readable storage medium of claim 18, wherein the operations further comprise:
selecting the reference based on a ranking associated with relevance of the reference to the text, wherein the ranking is based on the contextual information.

20. The non-transitory computer readable storage medium of claim 18, wherein the operations further comprise:
generating a table of contents of text and references.

* * * * *